(12) United States Patent
Nielsen

(10) Patent No.: US 7,177,649 B1
(45) Date of Patent: Feb. 13, 2007

(54) SYSTEM FOR LOAD BALANCING BASED ON CLASS OF SERVICE FOR WIRELESS COMMUNICATION NETWORKS

(75) Inventor: Georgene M. Nielsen, Westminster, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/560,294

(22) Filed: Apr. 27, 2000

Related U.S. Application Data

(63) Continuation-in-part of application No. 09/315,902, filed on May 20, 1999.

(51) Int. Cl.
   *H04Q 7/20* (2006.01)
(52) U.S. Cl. .......... 455/453; 455/436; 455/452.2; 455/67.11; 370/332
(58) Field of Classification Search .......... 455/512, 455/517, 453, 445, 446, 436, 437, 433, 443, 455/422, 450, 90.1, 575.1, 550.1, 66.1, 74, 455/452.1, 432.1, 452.2, 435, 67.11; 370/331, 370/332
   See application file for complete search history.

(56) References Cited

U.S. PATENT DOCUMENTS

| | | | | |
|---|---|---|---|---|
| 4,670,899 A | * | 6/1987 | Brody et al. | 455/453 |
| 5,175,867 A | * | 12/1992 | Wejke et al. | 455/453 |
| 5,241,685 A | * | 8/1993 | Bodin et al. | 455/436 |
| 5,293,641 A | * | 3/1994 | Kallin et al. | 455/453 |

(Continued)

*Primary Examiner*—Lana Le
(74) *Attorney, Agent, or Firm*—Patton Boggs LLP

(57) ABSTRACT

The system for load balancing based on class of service for wireless communication networks dynamically balances the traffic load among a plurality of cell sites by using multiple criteria to determine which cell site is selected to provide service to a mobile subscriber station. The load balancing process is executed in response to the wireless communication network assigning a cell site to provide service to a mobile subscriber station based upon a first criteria. It is then determined whether this cell site assignment results in secondary criteria being exceeded. If secondary criteria are exceeded by the assignment, the load balancing process is activated to reallocate mobile subscriber stations among the cell sites as a function of both the traffic load that exists in the cell sites as well as the class of service of the mobile subscriber stations served by the cell sites. Thus, the subscribers can pay a premium price for a higher quality of service, which gives preference to this mobile subscriber station in being assigned to a cell that has a greater signal strength and therefore a higher quality of service.

12 Claims, 4 Drawing Sheets

U.S. PATENT DOCUMENTS

| | | | |
|---|---|---|---|
| 5,428,815 A * | 6/1995 | Grube .................... 455/452.1 |
| 5,499,386 A * | 3/1996 | Karlsson .................... 455/437 |
| 5,542,093 A * | 7/1996 | Bodin et al. ................ 370/333 |
| 5,796,722 A * | 8/1998 | Kotzin et al. ................ 370/332 |
| 5,907,807 A * | 5/1999 | Chavez et al. .............. 455/436 |
| 5,956,644 A * | 9/1999 | Miller et al. ................ 455/453 |
| 6,009,331 A * | 12/1999 | Ueda .......................... 455/450 |
| 6,073,011 A * | 6/2000 | Horstein .................... 455/453 |
| 6,134,443 A * | 10/2000 | Spann et al. ................ 455/450 |
| 6,169,898 B1 * | 1/2001 | Hsu et al. .................... 455/436 |
| 6,216,006 B1 * | 4/2001 | Scholefield et al. ..... 455/452.2 |
| 6,219,541 B1 * | 4/2001 | Brodie ........................ 455/450 |
| 6,240,287 B1 * | 5/2001 | Cheng et al. ............... 455/453 |
| 6,487,413 B1 * | 11/2002 | Suojasto ................... 455/67.11 |
| 6,597,913 B2 * | 7/2003 | Natarajan ................... 455/453 |
| 6,792,275 B1 * | 9/2004 | Lo et al. .................. 455/452.2 |
| 6,950,656 B1 * | 9/2005 | Bahk et al. ................. 455/436 |
| 2004/0121777 A1 * | 6/2004 | Schwarz et al. ......... 455/452.1 |
| 2004/0203580 A1 * | 10/2004 | Engelhart ................ 455/550.1 |

\* cited by examiner

SYSTEM FOR LOAD BALANCING BASED ON CLASS OF SERVICE FOR WIRELESS COMMUNICATION NETWORKS

CROSS-REFERENCE TO RELATED APPLICATIONS

This application is a continuation-in-part of U.S. patent application Ser. No. 09/315,902, filed May 20, 1999 titled "Load Balancing For Cellular And Wireless Systems."

FIELD OF THE INVENTION

This invention relates to wireless communication networks and to a system that determines which cell site in the wireless communication network is selected to provide service to a mobile subscriber station based upon the class of service of the mobile subscriber station and the traffic load present in the wireless communication network.

PROBLEM

It is a problem in wireless communication networks to provide an adequate quality of service to the mobile subscriber stations that are operational within the service area of the wireless communication network. This is due to the fact that wireless communications have become a common means of communication. As more subscribers use wireless communications, the traffic presented to the cell sites of a wireless communication network increases and the load served by each cell site in the wireless communication network must be dynamically adjusted to balance the traffic load among the cell sites.

In a wireless communication network, all incoming and outgoing calls are routed through the Mobile Switching Center (MSC), which is connected to a plurality of base stations, each of which communicates with mobile subscriber stations located in the service area covered by that base station. The mobile subscriber stations are served by the base stations, each of which is located in one cell of a larger service region. Each base station contains a group of radio transmitters and receivers, with each transmitter-receiver pair being connected to the mobile switching center via a communication link. Each transmitter-receiver pair operates on a pair of radio frequencies: one frequency to transmit radio signals to the mobile subscriber station and the other frequency to receive radio signals from the mobile subscriber station. The base station converts between the Radio Frequency (RF) signals used to communicate with the mobile subscriber stations and the telephonic signals used to communicate with the wireless communication network.

In a typical wireless communication network, cell sites are located in close proximity to one another and the cells formed by the cell sites may overlap in order to ensure that there is a cell site that can provide communication service to a mobile subscriber station regardless of the location of the mobile subscriber station. Since the cells of cell sites may overlap, the mobile switching centers must determine which cell site will provide service to the mobile subscriber station. In a conventional wireless communication network, the cell site that provides service to a mobile subscriber station is determined by comparing the signal strength of signals exchanged between the mobile subscriber station and each cell site that receives signals from the mobile subscriber station. The cell site that has the strongest signal strength for signals from the mobile subscriber station is assigned to provide service to the mobile subscriber station.

Existing wireless communication networks frequently fail to provide a desired quality of service to their subscribers because signal strength is presently the only criteria used to determine which cell site provides service to mobile subscriber stations. An example of this problem is where a first and a second cell site have overlapping cells. The first cell site is providing service to a plurality of mobile subscriber stations because the signal strength between those mobile subscriber stations and the first cell site is the strongest when compared with the signal strengths between other cell sites and these mobile subscriber stations. Since the second cell site does not have the strongest signal strength with regard to any of this plurality of mobile subscriber stations, it does not provide service to any of these mobile subscriber stations. If another mobile subscriber station requests service in this service area and it is determined that the signal strength is strongest between the first cell site and the requesting mobile subscriber station, the new mobile subscriber station cannot be serviced if the first cell site is already providing service to a maximum number of mobile subscriber stations. Alternatively, the volume of traffic on the first cell site may cause delays in processing service requests from the mobile subscriber stations.

Therefore, existing wireless communication networks frequently fail to provide a desired quality of service to their subscribers because signal strength is presently the only criteria used to determine which cell site provides service to mobile subscriber stations. This problem is exacerbated as the number of subscribers increases and the traffic generated by these subscribers also increases. There is presently no system that addresses the load balancing issue in wireless communication networks.

SOLUTION

The above described problems are solved and a technical advance achieved by the present system for load balancing based on class of service for wireless communication networks which dynamically balances the traffic load among a plurality of cell sites by using multiple criteria to determine which cell site is selected to provide service to a mobile subscriber station. The load balancing process is executed in response to the wireless communication network assigning a cell site to provide service to a mobile subscriber station based upon a first criteria. It is then determined whether this cell site assignment results in secondary criteria being exceeded. If secondary criteria are exceeded by the assignment, the load balancing process is activated to reallocate mobile subscriber stations among the cell sites as a function of both the traffic load that exists in the cell sites as well as the class of service of the mobile subscriber stations served by the cell sites. Thus, the subscribers can pay a premium price for a higher quality of service, which is identified in the wireless communication network as an assigned class of service. The higher the mobile subscriber station class of service, the greater the preference given to this mobile subscriber station in being assigned to a cell that has a greater signal strength and therefore a higher quality of service, in that the call connection is less likely to be dropped and the clarity of the communications is greater than call connections with a lower signal strength. In traffic overload conditions, the mobile subscriber stations having a lower class of service are migrated to cells having a lesser signal strength to thereby reduce the traffic load on the cell with the highest signal strength.

DETAILED DESCRIPTION

Cellular communication networks represent one well known example of wireless communication networks and they function to provide the service of connecting mobile telecommunications customers, each having a mobile subscriber station, both to land-based customers who are served by the common carrier public switched telephone network as well as to other mobile telecommunications customers. The example of a cellular communication network is used in the following description to illustrate the features of the present system for load balancing based on class of service for wireless communication networks, but is not intended to limit the applicability of this system to other communication networks.

Wireless Communications Network Architecture

Figure 1:
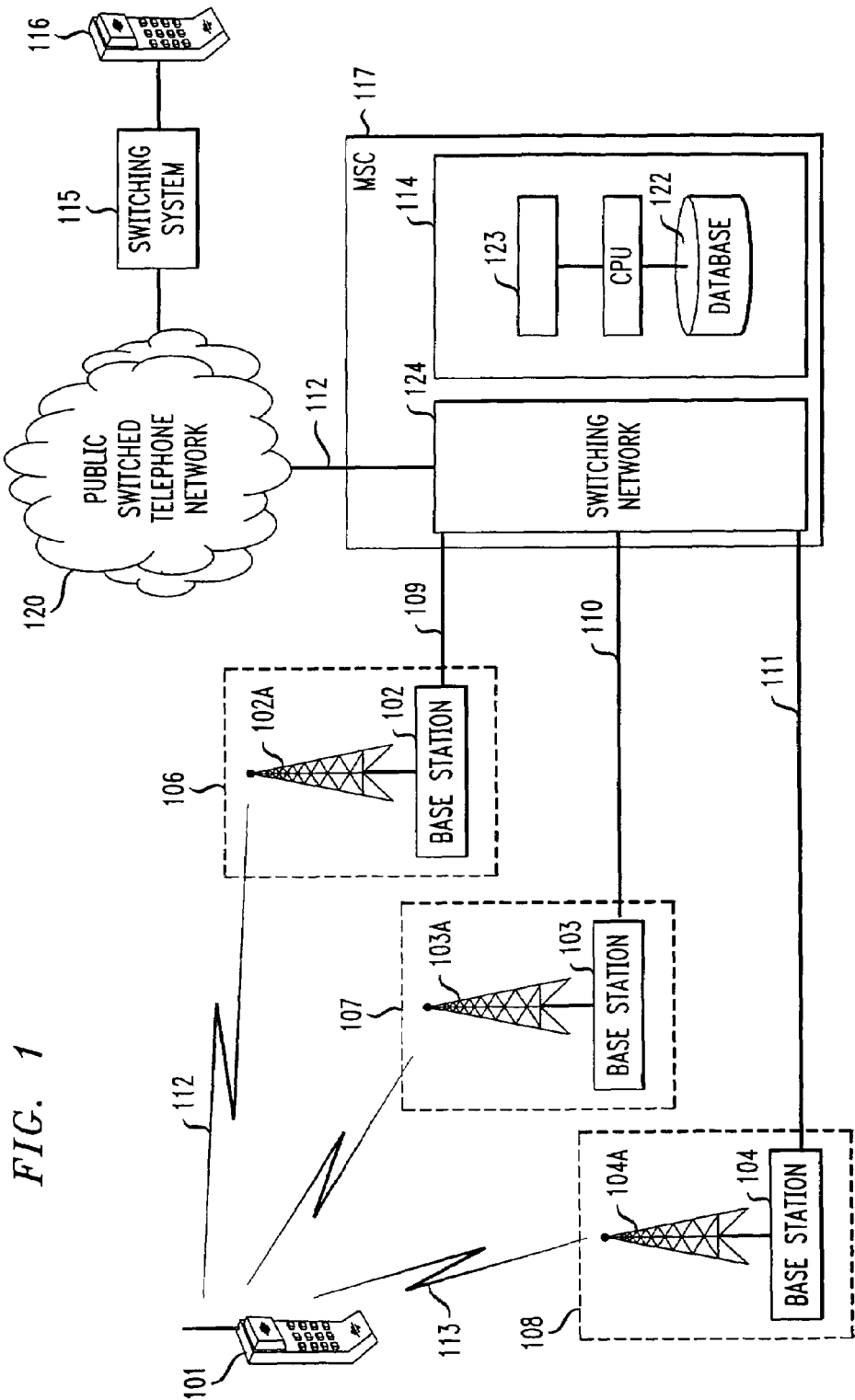
FIG. 1 illustrates in block diagram form the overall architecture of a wireless communication network that incorporates the present system for load balancing based on class of service for wireless communication networks.

FIG. 1 illustrates in block diagram form the overall architecture of a wireless communication network 100 that incorporates the present system for load balancing based on class of service for wireless communication networks 123. In such a system, all incoming and outgoing calls are routed through the Mobile Switching Center (MSC) 117, which is connected to a plurality of base stations 102–104, each of which communicates with mobile subscriber stations 101 located in the area (cell) covered by the radio frequency transmissions of base stations 102–104. Each base station 102–104 in a service region is connected by a group of communication links 109–111 to Mobile Switching Center 117, with the communication links 109–111 being either direct of indirect through a controller (not shown) that may span a plurality of base stations 102–104. A communication link 109–111 transports user data, which may be a digital representation of voice, between the base station 102–104 and the Mobile Switching Center 117. Each base station 102–104 contains a group of radio transmitters and receivers, with each transmitter-receiver pair being connected to one communication link 109–111. Each transmitter-receiver pair operates on a pair of radio frequencies: one frequency to transmit radio signals to the mobile subscriber station 101 and the other frequency to receive radio signals from the mobile subscriber station 101. With CDMA systems, a plurality of transmitter-receiver pairs share a common frequency pair. This is made possible by the orthogonal coding that is inherent with CDMA.

The first stage of a wireless communication connection is executed when a transmitter-receiver pair at the base station 102–104, operating on a predetermined pair of radio frequencies, is activated and a mobile subscriber station 101 is tuned to the same pair of radio frequencies. The second stage of the communication connection is executed at the Mobile Switching Center 117 during which the call path is extended to outgoing or incoming trunks 112 to the common carrier Public Switched Telephone Network 120. Local exchange switching system 115 and Mobile Switching Center 117 are connected by Public Switched Telecommunication Network 120 to complete communication connections between wireless subscribers and non-wireless subscribers, such as telephone station set 116. At this point in time, the call is considered as being established. The Mobile Switching Center 117 contains a switching network 124, such as the 5ESS-2000 Switch, to switch mobile customer's voice and/or data signals from the communication link 109–111 to incoming or outgoing trunks 112 and which provides the telephone connectivity between base stations 102 and 104. The Mobile Switching Center 117 has additional functionality such as billing, administration, and maintenance, requiring additional entities. However, the corresponding description of these entities are not essential to the embodiment of the disclosed invention. Base stations 102–104 communicate with mobile subscriber station 101 using RF channels 112–113, respectively. RF channels 112–113 convey both command messages as well as digital data, which may represent voice signals being articulated at the mobile subscriber station 101 and the far-end party.

The Mobile Switching Center 117 is controlled by a mobile telecommunication controller 114 which executes complex software stored in database 122 and controls the switching network 124. The mobile telecommunication controller 114 also controls the actions of the associated base station controllers by generating and interpreting the control messages that are exchanged with the associated base station controllers over the data links 109–111. The base station controllers at each base station 102–104, in response to control messages from the mobile telecommunication controller 114, control the assignment of transmitter-receiver pairs at the base station 102–104. The control processes at each base station 102–104 also control the tuning of the mobile subscriber stations to the selected radio frequency.

Each cell in the wireless communication network comprises a predetermined volume of space radially arranged around the base station transmitting antenna 102A–104A with the region of space roughly approximately a cylindrical volume having a limited height. Since all of the mobile subscriber stations are installed in ground-based stations (such as motor vehicles) in traditional wireless communication systems, the antenna radiation pattern of the base station 102–104 is aligned to be proximate to the ground and the polarization of the signals produced by the base station antenna 102A–104A is vertical in nature. In order to prevent the radio signals in one base station 102 from interfering with radio signals in an adjacent base station 104, the transmitter-receiver frequencies and/or orthogonal coding for adjacent base stations are selected to be different so that there is sufficient signal separation between adjacent transmitter frequencies and orthogonal coding to avoid overlapping transmissions among the adjacent base stations. When a mobile subscriber station 101 initiates a call connection, control signals from the local base station transmitter cause the frequency agile transceiver in the mobile subscriber station 101 to operate at the frequency of operation and orthogonal coding designated for that particular base station. As the mobile subscriber station 101 moves from one base station to another, the call connection is handed off to the successive base stations and the frequency agile transceiver in the mobile subscriber station 101 adjusts its frequency of operation and/or orthogonal coding of the transmitter located at the base station in which the mobile subscriber station 101 is presently operational. Furthermore, with CDMA, it is possible that a mobile subscriber station 101 may be simultaneously communicating with a plurality of base stations 102–104. Such a configuration is commonly called a soft handoff and is preferable to hand-offs in which a mobile subscriber station 101 is transferred from one base station to another. The latter type of handoff is commonly called a hard handoff. With a soft handoff, base stations are added or dropped from the plurality of base stations serving the mobile subscriber station 101 as the mobile subscriber station 101 traverses the serving area supported by the Mobile Switching Center 117.

Load Balancing Process for Wireless Communication Systems

Figure 2:
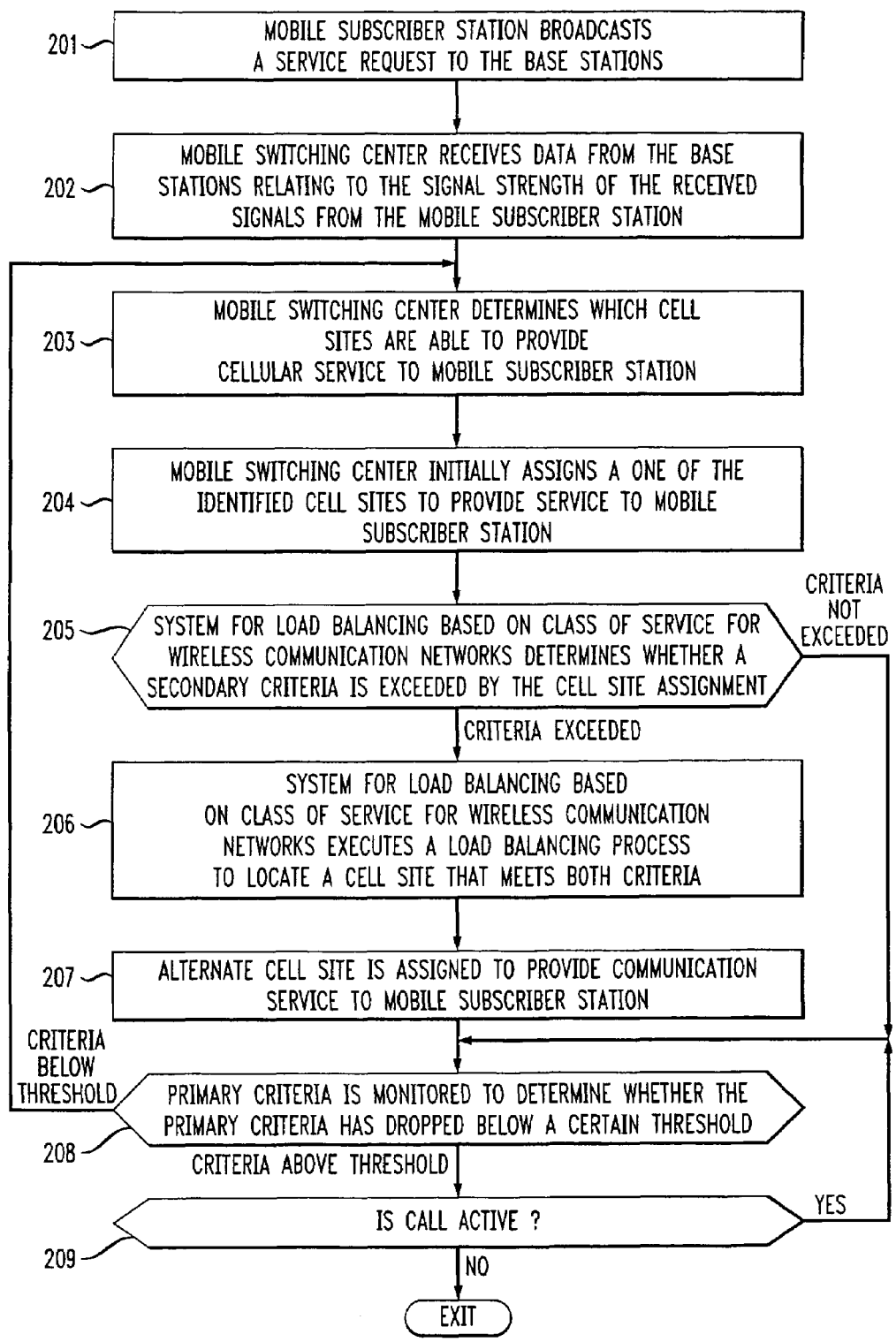
FIG. 2 illustrates in flow diagram form the operation of the present system for load balancing based on class of service for wireless communication networks.

FIG. 2 illustrates in flow diagram form the operation of the present system for load balancing based on class of service for wireless communication networks 124 which implements process 200 in which primary and secondary criteria are used to determine which cell site 106–108 provides service to mobile subscriber station 101. Process 200 begins in step 201 in which mobile subscriber station 101 broadcasts a service request to the base stations 102–104, which serve the mobile subscriber station's location, requesting cellular communication service. The signal is received by antennas 102A–104A in a plurality of cell sites 106–108. In step 202, Mobile Switching Center 117 receives data from the base stations 102–104 relating to the signal strength of the received signals from the mobile subscriber station 101 and determines at step 203 which cell sites 106–108 are able to provide cellular service to mobile subscriber station 101. For example, Mobile Switching Center 117 reviews the received data and identifies at least one and more likely a plurality of cell sites 106–108 capable of providing service to mobile subscriber station 101 based upon a primary criteria, such as signal strength. Mobile Switching Center 117 initially assigns one of the identified cell sites 106–108 at step 204 to provide service to mobile subscriber station 101. For example, cell site 108 may be assigned to serve mobile subscriber station 101 based upon signal strength between mobile subscriber station 101 cell site 108 being greater in magnitude than the other cell sites 106 that receive the signal requesting service, as is presently done in existing cellular communication systems.

After the cell site 108 has been initially assigned, the system for load balancing based on class of service for wireless communication networks 124 determines at step 205 whether a secondary criteria is exceeded by the assignment of cell site 108 to provide communication service to mobile subscriber station 101. For example, Mobile Switching Center 117 determines whether the traffic load of cells site 108 exceeds a predetermined threshold, such as 80% of capacity. If the secondary criteria is exceeded, then the cell site selection proceeds to step 206 to execute a load balancing process to locate a cell site 106 that meets both criteria. Once a cell site 106 has been found that meets both the primary criteria and secondary criteria at step 206, then cell site 106 is assigned to provide communication service to mobile subscriber station 101 at step 207 and the primary criteria is monitored in step 208. In step 209, it is determined whether the primary criteria has dropped below a certain threshold. For example, Mobile Switching Center 117 may determine whether the signal strength between mobile subscriber station 101 and selected cell site 106 has dropped below a predetermined level. If the primary criteria has dropped below the certain threshold, process 200 is repeated from step 202. Otherwise, Mobile Switching Center 117 determines whether mobile subscriber station 101 is still receiving service in step 209. If mobile subscriber station 101 is still receiving service steps 207–209 are repeated. Otherwise, process 200 ends.

Secondary Criteria for Load Balancing

Figure 3:
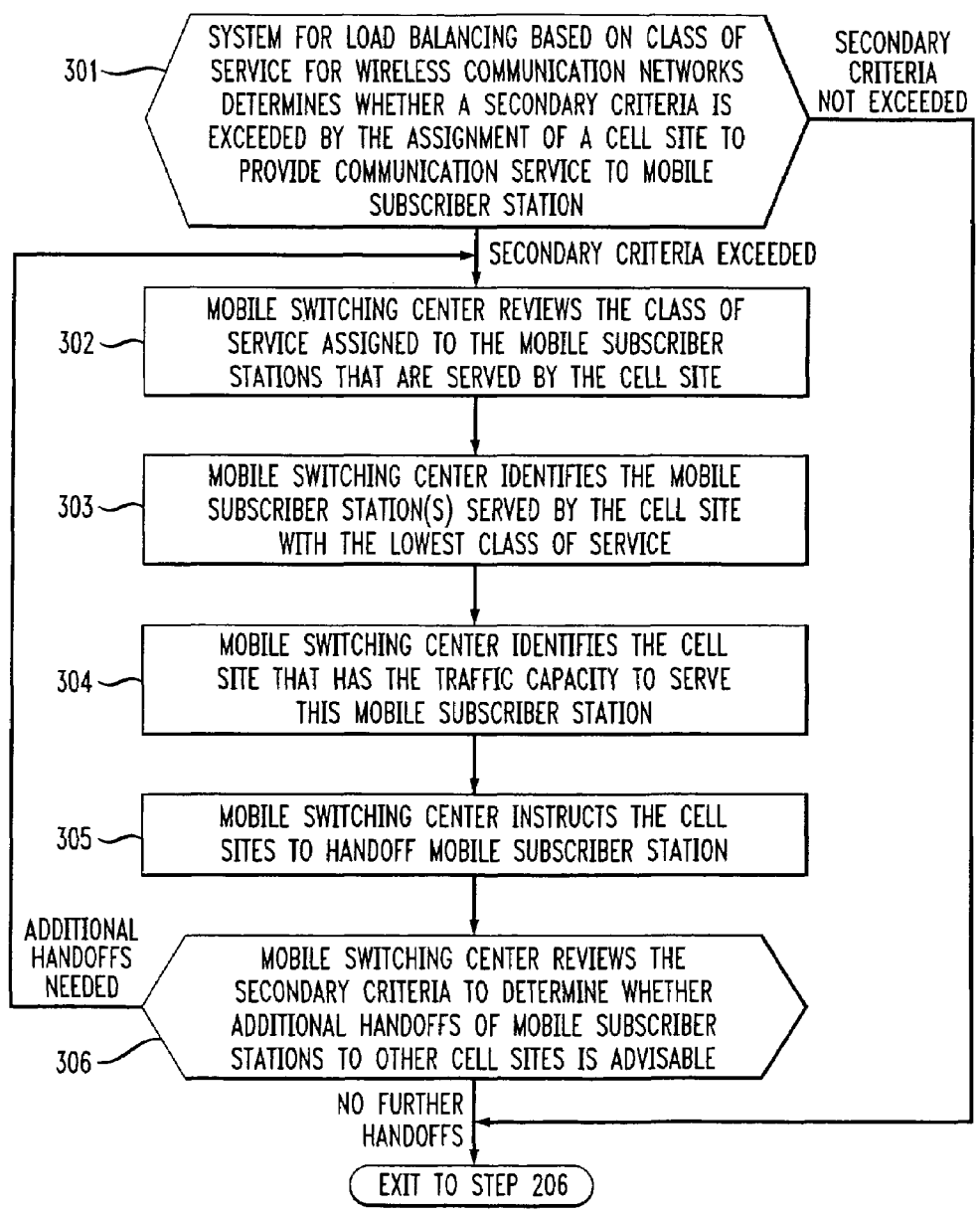
FIG. 3 illustrates in flow diagram form the operation of the load balancing portion of the present system for load balancing on class of service for wireless communication networks.
Figure 4:
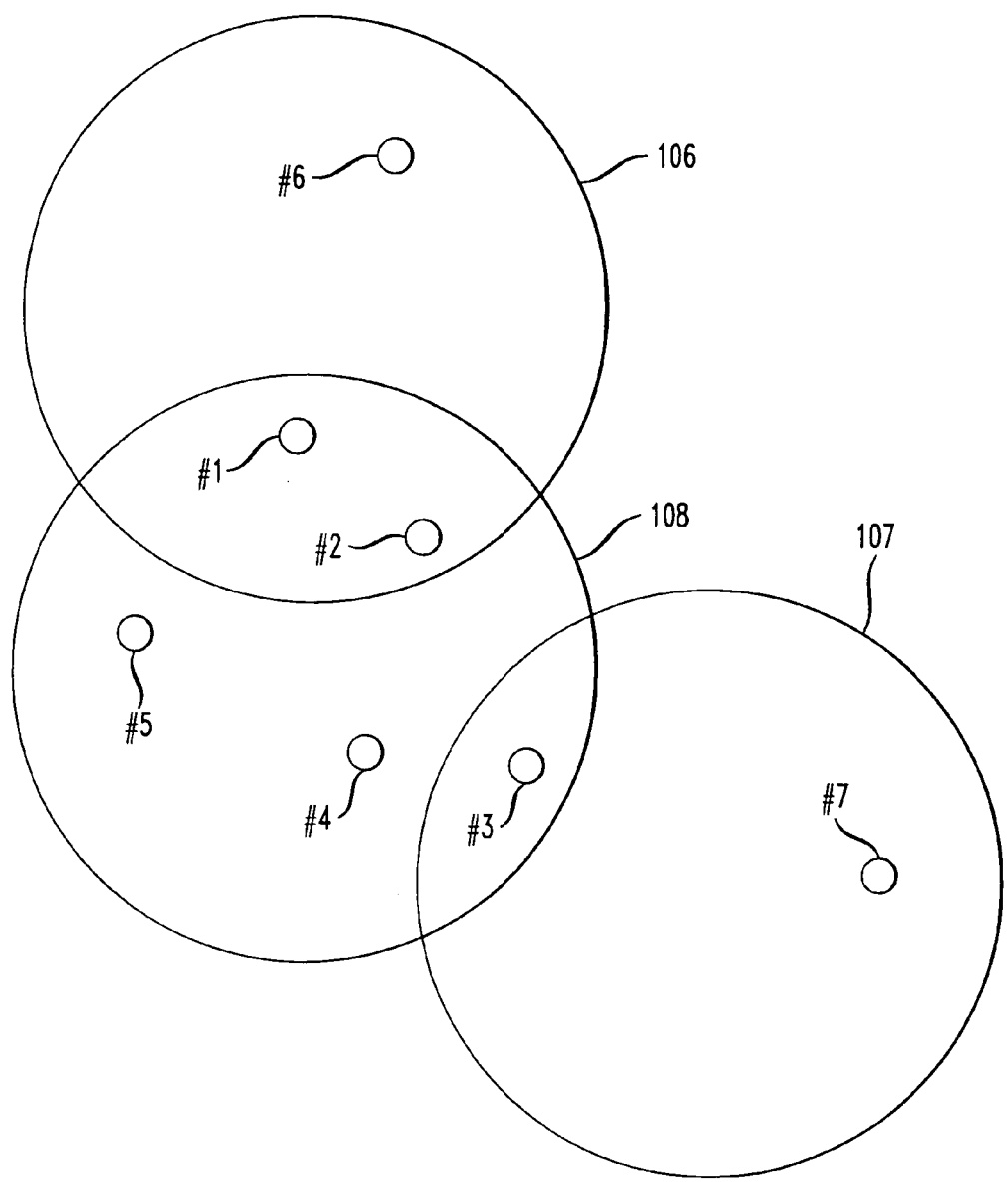
FIG. 4 illustrates a typical distribution of subscribers in the various cell sites of a Mobile Switching Center.

FIG. 3 illustrates in flow diagram form the operation of the load balancing portion of the present system for load balancing based on class of service for wireless communication networks and FIG. 4 illustrates a typical distribution of subscribers in the various cell sites of a Mobile Switching Center. As noted above, at step 205, the secondary criteria are used to further determine the proper processing of the subscriber's request. This processing 300 is performed by controller 114 of Mobile Switching Center 117 performing instructions stored in memory 122. Process 300 functions to balance the distribution of mobile communication service requests across the plurality of cell sites 106–108 by assigning cell sites 106–108 to service mobile subscriber stations 101 based upon not only the signal strength of the communications between the mobile subscriber station 101 and the base stations 102–104 but also secondary criteria such as: the traffic load of each cell site, the class of service assigned to each mobile subscriber station. The advantage of process 300 is that since multiple criteria are used for every assignment, the mobile subscriber stations 101 and the associated communication traffic are more evenly distributed over wireless communication network 100.

Process 300 is implemented as part of step 205 and begins in step 301 where, after the cell site 108 has been initially assigned, the system for load balancing based on class of service for wireless communication networks 124 determines whether a secondary criteria is exceeded by the assignment of cell site 108 to provide communication service to mobile subscriber station 101. There are a number of possible characteristics that can be monitored and the example of cell site traffic capacity is used as an example herein. Thus, Mobile Switching Center 117 determines whether or not the assigned traffic load for cell site 108 exceeds a predetermined threshold, such as 80% the maximum traffic capacity of cell site 108. If this threshold is not exceeded, the Mobile Switching Center 117 can use other parameters to determine whether any secondary considerations are exceeded, or processing can exit to step 206 of the main process illustrated in FIG. 2. If the threshold noted above is exceeded, the Mobile Switching Center 117 enters a load balancing mode to more evenly distribute the traffic over the cell sites 106–108. A typical distribution of subscribers is illustrated in FIG. 4, where the cell formed by cell site 108 serves a large number of mobile subscriber stations, with a few, noted as #2–#5 being illustrated. The cell formed by cell sites 106 and 107 are less densely populated by mobile subscriber stations, with this load being illustrated by mobile subscriber stations #6 and #7, respectively.

This traffic load redistribution is accomplished at step 302 by the Mobile Switching Center 117 reviewing the class of service assigned to the mobile subscriber stations #1–#5 that are served by cell site 108. This information is typically stored in the Home Location Register (HLR) of the Mobile Switching Center 117 along with the other mobile subscriber station identification information. The Mobile Switching Center 117 at step 303 identifies the mobile subscriber station(s) served by cell site 108 with the lowest class of service. The Mobile Switching Center 117 at step 304 identifies the cell site 106 (typically from the list generated at step 202) that has the traffic capacity to serve this mobile subscriber station, such as mobile subscriber station #1. Other considerations may also be used in selecting one or more mobile subscriber stations for relocation to other cell sites and these considerations can be typical call management factors, such as: duration of call connection, location of mobile subscriber within the cell, proximity to an adjacent call, signal strength in adjacent cells, and the like. At step 305, the Mobile Switching Center 117 instructs the cell sites 108, 106 to handoff mobile subscriber station #1 from cell site 108 to cell site 106. At step 306, the Mobile Switching Center 117 reviews the secondary criteria to determine whether additional handoffs of mobile subscriber stations to other cell sites is advisable. For example, if the relocation of a single mobile subscriber station has little impact on reducing the traffic load below the predetermined threshold, the process may be repeated a number of times to thereby realize processing efficiency since the data collection tasks of process 300 can be reused for subsequent mobile subscriber handoffs and the reduction of the traffic load below the threshold by a predetermined amount can be part of the load balancing processing. If so, processing returns to step 302 for additional processing to reduce the traffic load below the threshold by a predetermined amount. If not, load balancing exits to step 206 of the call processing of FIG. 2.

SUMMARY

The system for load balancing on class of service for wireless communication networks dynamically balances the traffic load among a plurality of cell sites by using multiple criteria to determine which cell site is selected to provide service to a mobile subscriber station. The criteria include the class of service assigned to the mobile subscriber stations served by the cell in which a first criteria, such as traffic load, is exceeded.

What is claimed is:

1. A system for load balancing for wireless communication networks having a plurality of cells, each cell adapted to serve a plurality of mobile subscriber stations, comprising:
   means, responsive to receipt of a service request from a mobile subscriber station, for establishing a communication connection for said requesting mobile subscriber station via at least one of said plurality of cells;
   means for determining when assignment of said mobile subscriber station to a cell results in a predetermined traffic load threshold being exceeded, comprising:
      means for measuring a traffic load in said cell,
      means for comparing said measured traffic load to a predetermined traffic load threshold;
   means, responsive to said predetermined traffic load threshold being exceeded, for selecting at least one of a plurality of mobile subscriber stations served by said cell for reassignment to another cell, comprising:
      means for identifying at least one of said plurality of mobile subscriber stations served by said cell with the lowest class of service,
      means for arbitrating among said identified mobile subscriber stations, using additional criteria selected from call management factors, including: duration of call connection, location of mobile subscriber station within the cell, proximity to an adjacent cell, and signal strength in adjacent cells; and
   means for initiating a handoff of said selected at least one mobile subscriber station to another cell in said wireless communication network.

2. The system for load balancing of claim 1 wherein said means for selecting further comprises:
   means for determining a class of service for said plurality of mobile subscriber stations served by said cell; and
   means for identifying another cell capable of serving said selected at least one mobile subscriber station.

3. The system of load balancing of claim 1 further comprising:
   means for effecting a handoff of a communication connection that serves said selected at least one mobile subscriber station from said cell to said another cell.

4. The system for load balancing of claim 1 further comprising:
   means, responsive to said means for effecting, for reviewing the additional criteria to determine whether additional handoffs of mobile subscriber stations to other cell sites is advisable.

5. A method of load balancing for wireless communication networks having a plurality of cells, each cell adapted to serve a plurality of mobile subscriber stations, comprising the steps of:
   establishing, in response to receipt of a service request from a mobile subscriber station, a communication connection for said requesting mobile subscriber station via at least one of said plurality of cells;
   determining when assignment of said mobile subscriber station to a cell results in a predetermined traffic load threshold being exceeded, comprising:
      measuring a traffic load in said cell,
      comparing said measured traffic load to a predetermined traffic load threshold;
   selecting, in response to said predetermined traffic load threshold being exceeded, at least one of a plurality of mobile subscriber stations served by said cell for reassignment to another cell, comprising:
      identifying at least one of said plurality of mobile subscriber stations served by said cell with the lower class of service,
      arbitrating among said identified mobile subscriber stations, using additional criteria selected from call management factors, including: duration of call connection, location of mobile subscriber station within the cell, proximity to an adjacent cell, and signal strength in adjacent cells; and
   initiating a handoff of said selected at least one mobile subscriber stations to another cell in said wireless communication network.

6. The method of load balancing of claim 5 wherein the steps of selecting further comprises:
   determining a class of service for said plurality of mobile subscriber stations served by said cell; and
   identifying another cell capable of serving said selected at least one mobile subscriber station.

7. The method of load balancing of claim 5 further comprising:
   effecting a handoff of a communication connection that serves said selected at least one mobile subscriber station from said cell to said another cell.

8. The method of load balancing of claim 5 further comprising:
   reviewing, in response to said step of effecting, the additional criteria to determine whether additional handoffs of mobile subscriber stations to other cell sites is advisable.

9. A system for load balancing for wireless communication networks having a plurality of cells, each cell adapted to serve a plurality of mobile subscriber stations, comprising:

service request processing means, responsive to receipt of a service request from a mobile subscriber station, for establishing a communication connection for said requesting mobile subscriber station via at least one of said plurality of cells;

traffic load determining means for determining when assignment of said mobile subscriber station to a cell results in a predetermined traffic load threshold being exceeded, comprising:
traffic load measurement means for measuring a traffic load in said cell,
traffic threshold means for comparing said measured traffic load to a predetermined traffic load threshold;

subscriber class of service identification means, responsive to said predetermined traffic load threshold being exceeded, for selecting at least one of a plurality of mobile subscriber stations served by said cell for reassignment to another cell, comprising:
mobile subscriber station identification means for identifying at least one of said plurality of mobile subscriber stations served by said cell with the lower class of service,
additional criteria determining means for arbitrating among said identified mobile subscriber stations, using additional criteria selected from call management factors, including: duration of call connection, location of mobile subscriber station within the cell, proximity to an adjacent cell, and signal strength in adjacent cells; and handoff means for initiating a handoff of said selected mobile subscriber stations to another cell in said wireless communication network.

10. The system for load balancing of claim 9 wherein said subscriber class of service identification means comprises:
class of service means for determining a class of service for said plurality of mobile subscriber stations served by said cell; and
candidate cell means for identifying another cell capable of serving said selected at least one mobile subscriber station.

11. The system for load balancing of claim 9 wherein said subscriber class of service identification means further comprises:
handoff activation means for effecting a handoff of a communication connection that serves said selected at least one mobile subscriber station from said cell to said another cell.

12. The system for load balancing of claim 9 wherein said subscriber class of service identification means further comprises:
threshold review means, responsive to said handoff activation means, for reviewing the additional criteria to determine whether additional handoffs of mobile subscriber stations to other cell sites is advisable.

* * * * *